United States Patent Office 3,560,555
Patented Feb. 2, 1971

3,560,555
PREPARATION OF 1-(CARBAMOYL)-N-(CARBAMOYLOXY)THIOFORMIMIDATES FROM ALKYL ACETOACETATES
Julius J. Fuchs, Wilmington, Del., assignor to E. I. du Pont de Nemours and Company, Wilmington, Del., a corporation of Delaware
No Drawing. Filed Dec. 27, 1968, Ser. No. 787,592
Int. Cl. C07c *161/00*
U.S. Cl. 260—482    16 Claims

ABSTRACT OF THE DISCLOSURE

1 - (carbamoyl) - N - (carbamoyloxy)thioformimidates such as methyl 1-(carbamoyl)-N-(methylcarbamoxyloxy) thioformimidate and methyl 1-(dimethylcarbamoyl)-N-(methylcarbamoyloxy)thioformimidate are prepared by the steps of
(a) reacting an alkyl acetocetate with nitrous acid produced in situ, in the presence of water or alcohol;
(b) chlorinating the product of (a) after cooling to —10 to 40° C.;
(c) reacting the hydroxamoyl chloride formed in (b) with an alkyl mercaptan and then adding a base;
(d) reacting the product of (c) with ammonia or an amine in the presence of water or an alcohol; and
(e) reacting the product of (d) with either
   (1) a carbamoyl chloride, optionally in the presence of a base; or
   (2) an isocyanate, optionally in the presence of a basic catalyst, in water or organic solvents such as acetone and methylene chloride.

BACKGROUND OF THE INVENTION

This invention relates to methods for preparing 1-(carbamoyl)-N-(carbamoyloxy)thioformimidates. More particularly, this invention is directed to methods of preparing the thioformimidates by reacting an alkyl acetoacetate with nitrous acid, chlorinating that reaction product, reacting the resultant hydroxamoyl chloride with an alkyl mercaptan in the presence of a base, then aminating, and then preparing the desired thioformimidates by reaction with either a suitable carbamoyl chloride or isocyanate optionally in the presence of a base.

The product thioformimidates are useful as pesticides and can be prepared in the manner disclosed in copending application Ser. No. 728,739, filed May 13, 1968. They can also be prepared from glyoxylic acid in the manner disclosed and claimed in copending application Ser. No. 772,811 filed Nov. 1, 1968.

By the methods of this invention it is possible to prepare the thioformimidates of Formula 1 below in a five-step process in which the first three steps can be operatively combined. By thus avoiding the necessity to separate and recover intermediate compounds the methods of this invention permit economic preparation of the compounds of Formula 1 below in outstanding yield.

SUMMARY

This invention is directed to the preparation of alkyl 1-(carbamoyl) - N - (carbamoyloxy)thioformimidates of the following formula (1) 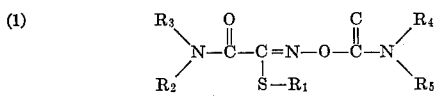

wherein
$R_1$ is alkyl of 1 through 4 carbon atoms or alkenyl of 3 through 4 carbon atoms;
$R_2$ is hydrogen, alkyl of 1 through 4 carbon atoms, alkenyl of 3 through 4 carbon atoms, methoxy, or cycloalkyl of 3 through 5 carbon atoms;
$R_3$ is hydrogen, alkyl or 1 through 4 carbon atoms or alkenyl of 3 through 4 carbon atoms; with the proviso that $R_2$ and $R_3$ can be joined and are alkylene of 2 through 6 carbon atoms, and with the limitation that $R_2$ and $R_3$ never total more than 7 carbon atoms;
$R_4$ is alkyl of 1 through 3 carbon atoms, allyl or propargyl; and
$R_5$ is hydrogen or methyl;
by the steps comprising:

(a) reacting an alkyl acetoacetate with nitrous acid produced in situ, in the presence of water, methanol, ethanol, isopropanol or their mixtures;
(b) cooling the product of (a) to —10 to 40° C. and chlorinating;
(c) reacting the product of (b) with an alkyl mercaptan then adding base to the reaction mixture;
(d) aminating the product of (c) with 2 moles of ammonia or an amine in the presence of water or alcohol; and
(e) reacting the product of (d) with a carbamoyl chloride or an isocyanate in water, acetone, methylene chloride, methyl ethyl ketone, or methyl isobutyl ketone in the presence or absence of a base.

The compounds of Formula 1 and their use as pesticides are described and exemplified in application Ser. No. 728,739, referred to above.

DESCRIPTION OF THE INVENTION

The process of this invention used in preparing the compounds of Formula 1 comprises the five steps enumerated above, and more fully described as follows:

Step (a)

The reaction of an alkyl acetoacetate with nitrous acid produced in situ, in the presence of water or an alcohol, is represented by the following equation:

(a) 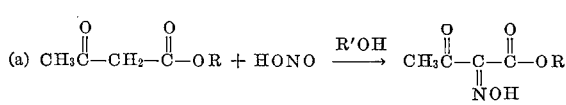

in which R is methyl, ethyl or isopropyl, and R' is hydrogen, methyl, ethyl or isopropyl.

The alkyl acetoacetate and solvent are charged initially to the reaction vessel. The source of nitrous acid is then added as rapidly as is convenient, either as a solid or in solution. If an acid is to be used to generate nitrous acid it is then added to the reaction mixture with agitation. The acid is added at such a rate that the temperature remains between —10 and 50° C. and preferably between 0 and 30° C. The addition rate of the acid is also controlled so that the pH of the reaction mixture does not go below 4.0 and preferably not below 4.5. If the acid is added at a rate so rapid that the pH and temperature control are not maintained, nitrous acid may be liberated too rapidly and enter into undesirable side reactions.

Water, methanol, ethanol, isopropanol and their mixtures are suitable solvents. Of these, water is generally the preferred solvent for reasons of economy and solubility. However, when isopropyl acetoacetate is used it is preferred to use an alcohol as a solvent to increase the solubility of the acetoacetate and facilitate its reaction.

Suitable sources of nitrous acid are dinitrogen trioxide; alkyl nitrites; and sodium nitrite, potassium nitrite and calcium nitrite in conjunction with a generating acid such as hydrochloric, sulfuric and acetic. Of these sodium nitrite in conjunction with hydrochloric acid is the preferred source of nitrous acid because of convenience and economy, and ease of handling the by-product sodium chloride.

Of the alkyl acetoacetates the methyl and ethyl esters are preferred because of their high water-solubility and low cost. Of these two, the methyl ester is most preferred.

As stated above, water is the preferred solvent and it is preferred to use water in an amount of about 0.4 liter per mole of alkyl acetoacetate. Thus when sodium nitrite and hydrochloric acid, the preferred source of nitrous acid, are used to generate nitrous acid the sodium chloride by-product remains in solution, facilitating handling of the reaction mixture.

The source of nitrous acid is used in stoichiometric amounts based on the alkyl acetoacetate. Greater or lesser amounts can be used but only at an economic disadvantage.

The generating acid when used is used in stoichiometric amounts based on the source of nitrous acid. Use of amounts greater or less than stoichiometric results in waste of one of the reactants.

If desired the product of step (a) can be isolated such as by extraction with a water-immiscible organic solvent followed by evaporation of the solvent. Methylene chloride is a suitable water-immiscible solvent. It is usually preferred to proceed directly to step (b) without isolating the product of step (a).

Step (b)

Step (b) comprises formation of the hydroxamoyl chloride and is illustrated by the equation

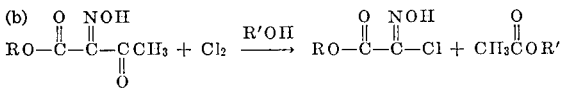

wherein R and R′ are as defined in step (a).

If the oxime ester of step (a) has been isolated or purified, it is preferred to mix the ester with water, cool the mixture and add chlorine. If the ester has not been isolated from the reaction medium of step (a) the product mixture is cooled and chlorinated without adding water.

The chlorination is carried out at a temperature between about −10° C. and 40° C. and preferably between +10° C. and 30° C. The amount of chlorine used will vary from stoichiometric to 5% molar excess but it is preferred to use stoichiometric amounts.

The chlorine is ordinarily added over a period of 30 to 45 minutes although it can be added more rapidly if desired. After addition is complete the mixture is stirred, usually for about 30 to 60 minutes, at a temperature of about 20° C. The reaction is complete when the color of the reaction mixture has disappeared.

Elemental chlorine is preferred as the source of chlorine for economic reasons, however other chlorinating agents, such as sulfuryl chloride, can be used if desired.

The product of step (b) can be isolated such as by filtration or extraction but it is usually preferred to go directly to step (c) without isolating the product of step (b).

Suitable solvents include water, methanol, ethanol, isopropanol and their mixtures. For economic reasons and to avoid side-reactions of chlorine with an alcohol, water is the preferred solvent and obviously when step (a) product is used without isolating the product from the solvent, step (b) is carried out in the solvent of step (a).

Step (c)

The hydroxamoyl chloride from step (b) is reacted with an alkyl mercaptan in a solvent and then the pH is raised by addition of a base according to the equation

wherein R, R′ and $R_1$ are as defined above.

For best yields the reaction product of step (b) is cooled to below 20° C. prior to addition of the mercaptan. A temperature range of 0 to −10° C. is most preferred.

Bases suitable for adjusting the pH are the hydroxides, carbonates and bicarbonates of sodium, potassium, calcium and magnesium. The final pH should be between 5 and 9 and a pH of about 7 is preferred.

The product can be isolated if desired by conventional techniques such as filtration, solvent extraction or distillation. Alternatively, the product mixture can be used as is in step (d).

Step (d)

The product of step (c) is reacted with an amine in the presence of water, methanol, ethanol, isopropanol or their mixtures according to the equation

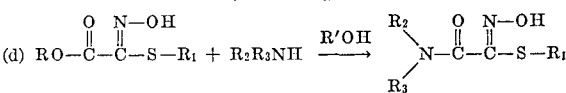

wherein R, R′, $R_1$, $R_2$ and $R_3$ are as defined above.

If the product of step (c) was isolated it is first dispersed with stirring in the solvent medium, preferably in one of the alcohols or an alcohol-water mixture.

To this mixture is added approximately 2 moles of ammonia, or a primary or secondary amine. A tertiary amine such as trimethylamine can be substituted for one mole of these amines with about the same results. Two moles of amine are necessary because one mole forms a salt with the oxime function while another mole participates directly in the reaction.

The product of step (d) can be isolated in a conventional manner such as by filtration or evaporation of the solvent. It is desirable to isolate this product or at least to remove any excess ammonia or amine, prior to performing the reaction of step (e).

Step (e)

Conversion of the product of step (d) to the oxime carbamate is carried out by reacting the product of step (d) with an isocyanate or a carbamoyl chloride according to the equation (e₁)

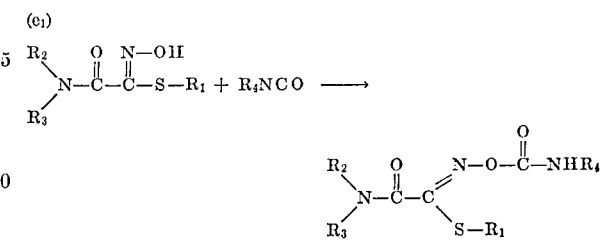

wherein $R_1$, $R_2$, $R_3$ and $R_4$ are as defined above, or (e₂)

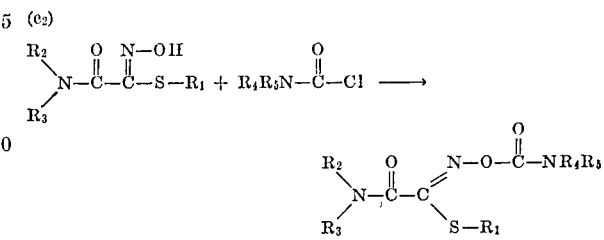

wherein $R_1$, $R_2$, $R_3$, $R_4$ and $R_5$ are as defined above.

The reactions of step (e) are carried out in a solvent such as water, acetone, methyl ethyl ketone, methyl isobutyl ketone, or methylene chloride, at a temperature which can range from below −10° C. to the boiling point of the solvent. An anhydrous solvent is preferred since isocyanates and carbamoyl chlorides can react with water. The reaction of step (e₁) is facilitated by the presence of a basic catalyst such as trimethylamine or triethylenediamine. The reaction of step (e₂) is advantageously carried out in the presence of a base such as triethylamine, trimethylamine or the hydroxides, carbonates bicarbonates of sodium, potassium, calcium or magnesium.

Alternatively, the sodium salt of the product of step (d) can be formed by reaction with a metal hydride such as sodium hydride. The resulting sodium salt can then be reacted with a carbamoyl chloride in an inert solvent such as tetrahydrofuran to obtain products as obtained in the (e₂) reaction.

The alkyl 1 - (carbamoyl)-N-(carbamoyl)thioformimidate products of step (e) can be isolated by conventional procedures such as filtration or extraction.

Of the steps (a) through (e) the more important are steps (a) and (b) and the most important is step (b) which provides an advantageous method of preparing the hydroxamoyl chloride. One preferred sequence of reactions is to chlorinate in a step (b) reaction a previously obtained ester, prepared by any suitable process, and follow this chlorination with the steps (c), (d) and (e).

The process of this invention is further illustrated in the following examples wherein parts and percentages are by weight unless otherwise noted.

EXAMPLE I

To a solution of 116.1 parts of methyl acetoacetate and 70 parts of sodium nitrite in 400 parts of water at 30° C. kept under a nitrogen atmosphere, is added gradually 100 parts of 36% aqueous hydrochloric acid so that the pH of the solution remains above 4.5. The resulting two-phase reaction mixture is then cooled to 20° C. and 72 parts of chlorine are added at 20° C. in 30–45 minutes. When the chlorine has all been added, the two-phase reaction mixture is agitated for ½ hour at 20° C. The reaction mixture is then cooled to −10° C. and 55 parts of methyl mercaptan are added, followed by the gradual addition of 240 parts of 50% aqueous sodium hydroxide solution at −10 to −5° C., at which time a stable pH of 7 is obtained. The resulting reaction mass is then extracted with methylene chloride, followed by evaporation of the methylene chloride under vacuum. The resulting residue consisting of crude methyl 1-methoxycarbonyl-N-hydroxythioformimidate, is then dissolved in 200 parts of methanol and 100 parts of anhydrous dimethylamine are dissolved in the solution at a temperature below 30° C. This solution is allowed to stand at ambient temperatures overnight. Removal of excess dimethylamine and the solvent under reduced pressure leaves 106 parts (66% of theory) of methyl 1-(dimethylcarbamoyl)-N-hydroxythioformimidate, melting point 183–184° C.

To a suspension of 70 parts of methyl 1-(dimethylcarbamoyl)-N-hydroxythioformimidate and ½ part of triethylenediamine in 350 parts of acetone at 40° C. is added slowly 27 parts of methyl isocyanate. The temperature of the reaction mass rises to 58° C. during the addition. After the temperature of the reaction mass has subsided to 25° C., the solvent is evaporated under reduced pressure, and the resulting residue crystallized. Recrystallization from benzene gives an isomer of methyl 1-(dimethylcarbamoyl) - N - (methylcarbamoyloxy)thioformimidate, melting point 109–110° C. Recrystallization from water gives the other isomer of methyl 1-(dimethylcarbamoyl)-N - (methylcarbamoyloxy)thioformimidate, melting point 101–103° C.

Similar results are obtained in the above example by substituting equivalent amounts of ethyl acetoacetate or isopropyl acetoacetate for the methyl acetoacetate. Likewise equivalent quantities of potassium nitrite or calcium nitrite can be substituted for the sodium nitrite in Example I.

The compounds of Table I are prepared by the procedures of Example I, usng the mercaptans, amines and isocyanates listed in place of the methyl mercaptan, dimethylamine and methyl isocyanate of Example I.

TABLE I

| Mercaptan | Amine | Isocyanate | Product |
|---|---|---|---|
| Ethyl mercaptan | Dimethylamine | Methyl isocyanate | Ethyl 1-dimethylcarbamoyl-N-(methylcarbamoyloxy)thioformimidate. |
| Allyl mercaptan | do | do | Allyl 1-dimethylcarbamoyl-N-(methylcarbamoyloxy)thioformimidate. |
| But-2-enyl mercaptan | do | Ethyl isocyanate | But-2-enyl 1-dimethylcarbamoyl-N-(ethylcarbamoyloxy)thioformimidate. |
| Isopropyl mercaptan | do | Allyl isocyanate | Isopropyl 1-dimethylcarbamoyl-N-(allylcarbamoyloxy)thioformimidate. |
| Methyl mercaptan | do | Propargyl isocyanate | Methyl 1-dimethylcarbamoyl-N-(propargylcarbamoyloxy)thioformimidate. |
| Propyl mercaptan | do | Methyl isocyanate | Propyl 1-dimethylcarbamoyl-N-(methylcarbamoyloxy)thioformimidate. |
| Allyl mercaptan | do | Allyl isocyanate | Allyl 1-dimethylcarbamoyl-N-(allylcarbamoyloxy)thioformimidate. |
| Isopropyl mercaptan | do | Methyl isocyanate | Isopropyl 1-dimethylcarbamoyl-N-(methylcarbamoyloxy)thioformimidate. |
| Butyl mercaptan | do | do | Butyl 1-dimethylcarbamoyl-N-(methylcarbamoyloxy)thioformimidate. |
| sec-Butyl mercaptan | do | do | sec-Butyl 1-dimethylcarbamoyl-N-(methylcarbamoyloxy)thioformimidate. |
| tert-Butyl mercaptan | do | do | tert-Butyl 1-dimethylcarbamoyl-N-(methylcarbamoyloxy)thioformimidate. |
| Methyl mercaptan | do | Ethyl isocyanate | Methyl 1-dimethylcarbamoyl-N-(ethylcarbamoyloxy)thioformimidate. |
| Butyl mercaptan | do | do | Butyl 1-dimethylcarbamoyl-N-(ethylcarbamoyloxy)thioformimidate. |
| Methyl mercaptan | do | Isopropyl isocyanate | Methyl 1-dimethylcarbamoyl-N-(isopropylcarbamoyloxy)thioformimidate. |
| Butyl mercaptan | do | do | Butyl 1-dimethylcarbamoyl-N-(isopropylcarbamoyloxy)thioformimidate. |
| Allyl mercaptan | do | Propyl isocyanate | Allyl 1-dimethylcarbamoyl-N-(propylcarbamoyloxy)thioformimidate. |
| Methyl mercaptan | do | Allyl isocyanate | Methyl 1-dimethylcarbamoyl-N-(allylcarbamoyloxy)thioformimidate. |
| Butyl mercaptan | do | do | Butyl 1-dimethylcarbamoyl-N-(allylcarbamoyloxy)thioformimidate. |
| Allyl mercaptan | do | Propargyl isocyanate | Allyl 1-dimethylcarbamoyl-N-(propargylcarbamoyloxy)thioformimidate. |
| Methyl mercaptan | Methylamine | Methyl isocyanate | Methyl 1-(methylcarbamoyl)-N-(methylcarbamoyloxy)thioformimidate. |
| Do | Butylamine | do | Methyl 1-(butylcarbamoyl)-N-(methylcarbamoyloxy)thioformimidate. |
| Isopropyl mercaptan | Cyclopropylamine | do | Isopropyl 1-(cyclopropylcarbamoyl)-N-(methylcarbamoyloxy)thioformimidate. |
| Allyl mercaptan | N,O-dimethylhydroxylamine | Ethyl isocyanate | Allyl 1-(N-methoxy-N-methylcarbamoyl)-N-(ethylcarbamoyloxy)-thioformimidate. |
| Butyl mercaptan | Allylamine | do | Butyl 1-(allylcarbamoyl)-N-(ethylcarbamoyloxy)thioformimidate. |

TABLE I.—Continued

| Mercaptan | Amine | Isocyanate | Product |
|---|---|---|---|
| Methyl mercaptan | Diallylamine | Allyl isocyanate | Methyl 1-(diallylcarbamoyl)-N-(allylcarbamoyloxy)thioformimidate. |
| Ethyl mercaptan | Isopropylamine | do | Ethyl 1-(isopropylcarbamoyl)-N-(allylcarbamoyloxy)thioformimidate. |
| Methyl mercaptan | Ethylamine | Propargyl isocyanate | Methyl 1-(ethylcarbamoyl)-N-(propargylcarbamoyloxy)thioformimidate. |
| Do | Diethylamine | Methyl isocyanate | Methyl 1-(diethylcarbamoyl)-N-(methylcarbamoyloxy)thioformimidate. |
| Do | Diisopropylamine | do | Methyl 1-(diisopropylcarbamoyl)-N-(methylcarbamoyloxy)thioformimidate. |
| Ethyl mercaptan | But-2-enylamine | Isopropyl isocyanate | Ethyl 1-(but-2-enylcarbamoyl)-N-isopropylcarbamoyloxy)thioformimidate. |
| Methyl mercaptan | Aziridine | Methyl isocyanate | Methyl 1-(aziridinocarbonyl)-N-(methylcarbamoyloxy)thioformimidate. |
| Do | Hexahydroazepine | do | Methyl 1-(hexahydroazepinocarbonyl)-N-(methylcarbamoyloxy)thioformimidate. |
| Do | Pyrrolidine | do | Methyl 1-(pyrrolidinocarbonyl)-N-(methylcarbamoyloxy)thioformimidate. |
| Do | Methylamine | Allyl isocyanate | Methyl 1-(methylcarbamoyl)-N-(allylcarbamoyloxy)thioformimidate. |
| Do | Allylamine | Propargyl isocyanate | Methyl 1-(allylcarbamoyl)-N-(propargylcarbamoyloxy)thioformimidate. |
| Do | N,O-dimethylhydroxylamine | Methyl isocyanate | Methyl 1-(N-methoxy-N-methylcarbamoyl)-N-(methylcarbamoyloxy)thioformimidate. |
| Do | N-methyl-N-ethylamine | Allyl isocyanate | Methyl 1-(N-methyl-N-ethylcarbamoyl)-N-(allylcarbamoyloxy)thioformimidate. |
| Ethyl mercaptan | Piperidine | do | Ethyl 1-(piperidinocarbonyl)-N-(allylcarbamoyloxy)thioformimidate. |
| Do | do | Butyl isocyanate | Ethyl 1-(piperidinocarbonyl)-N-(butylcarbamoyloxy)thioformimidate. |
| Butyl mercaptan | do | Methyl isocyanate | Butyl 1-(piperidinocarbonyl)-N-(methylcarbamoyloxy)thioformimidate. |
| Do | do | Butyl isocyanate | Butyl 1-(piperidinocarbonyl)-N-(butylcarbamoyloxy)thioformimidate. |
| Methyl mercaptan | N-methyl-N-butylamine | Methyl isocyanate | Methyl 1-(N-methyl-N-butylcarbamoyl)-N-(methylcarbamoyloxy)thioformimidate. |
| Do | N-methyl-N-allylamine | do | Methyl 1-(N-methyl-N-allylcarbamoyl)-N-(methylcarbamoyloxy)thioformimidate. |

EXAMPLE II

Crude methyl 1-methoxycarbonyl-N-hydroxythioformimidate obtained as in Example I above, is dissolved in 200 parts of concentrated aqueous ammonia at a temperature below 30° C. The solution is allowed to stand overnight. After removal of a small amount of undissolved material by filtration, the filtrate is concentrated under reduced pressure to give 105 parts of methyl 1-(carbamoyl)-N-hydroxythioformimidate, melting point 163–164° C.

To a suspension of 400 parts of methyl 1-(carbamoyl)-N-hydroxythioformimidate and 1 part of triethylenediamine in 2000 parts of acetone at 40° C. are added slowly 171 parts of methyl isocyanate. The temperature of the reaction mixture rises to 58° C. during the addition and then subsides to 25° C. At this point the reaction mass is cooled to 0° C. and 547 parts of the product methyl 1-(carbamoyl)-N-(methylcarbamoyloxy) - thioformimidate is filtered off. The product has a melting point of 161–165° C.

The compounds of Table II are prepared by the procedures of Examples I and II, using the mercaptans and isocyanates listed in place of methyl mercaptan and methyl isocyanate of Examples I and II.

EXAMPLE III

To a solution of 116.1 parts of methyl acetoacetate and 70 parts of sodium nitrite in 400 parts of water at 30° C., which is kept under a nitrogen blanket, is gradually added 100 parts of 36% aqueous hydrochloric acid so that the pH of the solution remains above 4.5. The resulting two-phase reaction mixture is then cooled to 20° C. and 72 parts of chlorine added at 20° C. within 30–45 minutes. When the chlorine has all been added, the two-phase reaction mixture is agitated for ½ hour, at the end of which it has become colorless. The reaction mixture is then cooled to −10 ° C. and 55 parts of methyl mercaptan added, followed by the gradual addition of 240 parts of 50% aqueous sodium hydroxide solution at −10 to −5° C. until a stable pH of 7 is obtained. The resulting reaction mass is then extracted with methylene chloride. Evaporation of the solvent under reduced pressure leaves 137 parts of crude 1-(methoxycarbonyl)-N-hydroxythioformimidate, which is purified by recrystallization from benzene to give pure material with a melting point of 63–64° C.

EXAMPLE IV

To a solution of 116.1 parts of methyl acetoacetate and 70 parts of sodium nitrite in 400 parts of water at

TABLE II

| Mercaptan | Isocyanate | Product |
|---|---|---|
| Ethyl mercaptan | Methyl isocyanate | Ethyl 1-carbamoyl-N-(methylcarbamoyloxy)thioformimidate. |
| Allyl mercaptan | do | Allyl 1-carbamoyl-N-(methylcarbamoyloxy)thioformimidate. |
| But-2-enyl mercaptan | Ethyl isocyanate | But-2-enyl 1-carbamoyl-N-(ethylcarbamoyloxy)thioformimidate. |
| Isopropyl mercaptan | Allyl isocyanate | Isopropyl 1-carbamoyl-N-(allylcarbamoyloxy)thioformimidate. |
| Methyl mercaptan | Propargyl isocyanate | Methyl 1-carbamoyl-N-(propargylcarbamoyloxy)thioformimidate. |
| Propyl mercaptan | Methyl isocyanate | Propyl 1-carbamoyl-N-(methylcarbamoyloxy)thioformimidate. |
| Allyl mercaptan | Allyl isocyanate | Allyl 1-carbamoyl-N-(allylcarbamoyloxy)thioformimidate. |
| Isopropyl mercaptan | Methyl isocyanate | Isopropyl 1-carbamoyl-N-(methylcarbamoyloxy)thioformimidate. |
| Butyl mercaptan | do | Butyl 1-carbamoyl-N-(methylcarbamoyloxy)thioformimidate. |
| sec-Butyl mercaptan | do | sec-Butyl 1-carbamoyl-N-(methylcarbamoyloxy)thioformimidate. |
| tert-Butyl mercaptan | do | tert-Butyl 1-carbamoyl-N-(methylcarbamoyloxy)thioformimidate. |
| Methyl mercaptan | Ethyl isocyanate | Methyl 1-carbamoyl-N-(ethylcarbamoyloxy)thioformimidate. |
| Butyl mercaptan | do | Butyl 1-carbamoyl-N-(ethylcarbamoyloxy)thioformimidate. |
| Methyl mercaptan | Isopropyl isocyanate | Methyl 1-carbamoyl-N-(isopropylcarbamoyloxy)thioformimidate. |
| Butyl mercaptan | do | Butyl 1-carbamoyl-N-(isopropylcarbamoyloxy)thioformimidate. |
| Allyl mercaptan | do | Allyl 1-carbamoyl-N-(isopropylcarbamoyloxy)thioformimidate. |
| Do | Propyl isocyanate | Allyl 1-carbamoyl-N-(propylcarbamoyloxy)thioformimidate. |
| Methyl mercaptan | Allyl isocyanate | Methyl 1-carbamoyl-N-(allylcarbamoyloxy)thioformimidate. |
| Butyl mercaptan | do | Butyl 1-carbamoyl-N-(allylcarbamoyloxy)thioformimidate. |
| Allyl mercaptan | Propargyl isocyanate | Allyl 1-carbamoyl-N-(propargylcarbamoyloxy)thioformimidate. |

30° C. under a nitrogen blanket, is gradually added 100 parts of 36%! aqueous hydrochloric acid so that the pH of the solution remains above 4.5. A yellow two-phase reaction mixture of methyl acetoacetate oxime and water is formed; the product can be separated by decantation or extraction with methylene chloride, and can be purified by distillation at 82–86° C./0.15 mm., or by crystallization from carbon tetrachloride. The product has a melting point of 34–37° C.

The yellow two-phase reaction mixture of methyl acetoacetate oxime obtained above is treated after cooling to 20° C. with 72 parts of chlorine within 30–45 minutes. The two-phase reaction mixture becomes darker at the start of the chlorination, but the color becomes lighter as the chlorination progresses. When all of the chlorine has been added, the two-phase reaction mixture is agitated at 20° C. for ½ hour, at the end of which a colorless reaction mixture has resulted. The mixture is extracted with methylene chloride. After evaporation of the methylene chloride there is obtained 125 parts of oily, crude 1-(methoxycarbonyl)formhydroxamoyl chloride, which crystallizes when cooled. Recrystallization from benzene gives pure 1-(methoxycarbonyl)formhydroxamoyl chloride with a melting point of 63–65° C.

EXAMPLE V

To a solution of 72.5 parts of distilled methyl acetoacetate oxime in 200 parts of water is added within 30 minutes 36 parts of chlorine at 15–20° C. Immediately on introduction of the chlorine, the solution becomes brown, but the color gradually turns to yellow with the precipitation of an oil. When all of the chlorine has been added, the reaction mixture is agitated until it becomes colorless, which occurs within ½ hour at 20° C. Extraction with methylene chloride, drying of the solution with calcium chloride and evaporation of the solvent gives 65 parts of oily, crude 1-(methoxycarboxy)formhydroxamoyl chloride, which contains small amounts of acetic acid. The crude product crystallizes when cooled, and can be purified by recrystallization from benzene to give pure 1-(methoxycarbonyl)formhydroxamoyl chloride with a melting point of 63–65° C.

EXAMPLE VI

To a stirred suspension of 48 parts of 50% sodium hydride and mineral oil in 648 parts of tetrahydrofuran is added in portions, over a one-hour period, 114 parts of methyl 1 - (carbamoyl) - N - hydroxythioformimidate. The temperature is maintained at 20 to 30° C. After subsidence of hydrogen evolution, 107.5 parts of dimethylcarbamoyl chloride is added dropwise at 15–25° C. Stirring is continued for one hour after the completion of the addition. The inorganic solids are then removed by filtration and the methyl 1-carbamoyl-N-(dimethylcarbamoyloxy)thioformimidate is recovered by removal of the solvent under reduced pressure.

The compounds of Table III are prepared according to the procedures of Example VI, using the N-hydroxythioformimidates and carbamoyl chlorides listed in place of methyl 1-(carbamoyl)-N-hydroxythioformimidate and dimethylcarbamoyl chloride.

TABLE III

| N-hydroxythioformimidate | Carbamoyl chloride | Product |
|---|---|---|
| Methyl 1-carbamoyl-N-hydroxythioformimidate | N-allyl-N-methylcarbamoyl chloride | Methyl 1-carbamoyl-N-(N-allyl-N-methylcarbamoyloxy)thioformimidate. |
| Do | N-methyl-N-propargylcarbamoyl chloride | Methyl 1-carbamoyl-N-(N-methyl-N-propargylcarbamoyloxy)thioformimidate. |
| Do | N-methyl-N-propylcarbamoyl chloride | Methyl 1-carbamoyl-N-(N-methyl-N-propylcarbamoyloxy)thioformimidate. |
| Do | N-ethyl-N-methylcarbamoyl chloride | methyl 1-carbamoyl-N-(-N-ethyl-N-methylcarbamoyloxy)thioformimidate. |
| Methyl 1-methylcarbamoyl-N-hydroxythioformimidate | Dimethylcarbamoyl chloride | Methyl 1-(methylcarbamoyl)-N-(dimethylcarbamoyloxy)thioformimidate. |
| Methyl 1-dimethylcarbamoyl-N-hydroxythioformimidate | do | Methyl 1-(dimethylcarbamoyl)-N-(dimethylcarbamoyloxy)thioformimidate. |
| Methyl 1-cyclopentylcarbamoyl-N-hydroxythioformimidate | do | Methyl 1-(cyclopentylcarbamoyl)-N-(dimethylcarbamoyloxy)thioformimidate. |
| Propyl 1-carbamoyl-N-hydroxythioformimidate | do | Propyl 1-carvamoyl-N-(dimethylcarbamoyloxy)thioformimidate. |
| Ethyl 1-carbamoyl-N-hydroxythioformimidate | do | Ethyl 1-carbamoyl-N-(dimethylcarbamoyloxy)thioformimidate. |
| Butyl 1-carbamoyl-N-hydroxythioformimidate | do | Butyl 1-carbamoyl-N-(dimethylcarbamoyloxy)thioformimidate. |
| Methyl 1-piperdinocarbonyl-N-hydroxythioformimidate | do | Methyl 1-piperidinocarbonyl-N-(dimethylcarbamoyloxy)thioformimidate. |
| Allyl 1-carbamoyl-N-hydroxythioformimidate | do | Allyl 1-carbamoyl-N-(dimethylcarbamoyloxy)thioformimidate. |
| But-2-enyl 1-carbamoyl-N-hydroxythioformimidate | do | But-2-enyl 1-carbamoyl-N-(dimethylcarbamoyloxy)thioformimidate. |

I claim:

1. A process for preparing 1-(carbamoyl)-N-carbamoyloxy)thioformimidates of the formula (1) 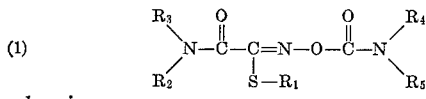

wherein $R_1$ is alkyl of 1 through 4 carbon atoms or alkenyl of 3 through 4 carbon atoms;

$R_2$ is ydrogen, alkyl of 1 through 4 carbon atoms, alkenyl of 3 through 4 carbon atoms, methoxy or cycloalkyl of 3 through 5 carbon atoms;

$R_3$ is hydrogen, alkyl of 1 through 4 carbon atoms, or alkenyl of 3 through 4 carbon atoms; with the proviso that $R_2$ and $R_3$ can be taken together and are alkylene of 2 through 6 carbon atoms, and with the limitation that $R_2$ and $R_3$ never total more than 7 carbon atoms;

$R_4$ is alkyl of 1 through 3 carbon atoms, allyl or propargyl; and $R_5$ is hydrogen or methyl;

by the steps comprising (a) reacting methyl, ethyl, or isopropyl acetoacetate with nitrous acid produced in situ, in the presence of water, methanol, ethanol, isopropanol or their mixtures;

(b) cooling the product of step (a) to a temperature of from about −10 to 40° C. and chlorinating the cooled product in the presence of water, methanol, ethanol, isopropanol or their mixtures;

(c) reacting the product of step (b) with an alkyl mercaptan of the formula $R_1SH$ wherein $R_1$ is as defined above; and then raising the pH to the range of 5–9 by the addition of a hydroxide, carbonate or bicarbonate of sodium, potassium, calcium or magnesium;

(d) aminating the product of step (c) with about 2 moles per mole of product of ammonia, a primary amine or a secondary amine in the presence of water, methanol, ethanol, isopropanol or their mixtures; and (e) reacting the product of step (d) with an appropriate isocyanate or carbamoyl chloride in the presence of water, acetone, methylene chloride, methyl ethyl ketone, or methyl isobutyl ketone and in the presence or absence of a base.

2. The process of claim 1 wherein the amination is carried out with ammonia.

3. The process of claim 1 wherein amination is carried out with dimethylamine.

4. The process of claim 1 wherein step (a) is carried out in water, using sodium nitrite and hydrochloric acid as the source of nitrous acid.

5. The process of claim 1 wherein step (b) is carried out at a temperature between 10° C. and 30° C.

6. The process of claim 1 wherein step (c) is carried out after cooling to a temperature below 20° C.

7. The process of claim 1 wherein step (d) is carried out in methanol, ethanol, isopropanol or their mixtures with water.

8. The process of claim 1 wherein excess ammonia or amine are removed after step (d) and prior to step (e).

9. The process of claim 1 wherein step (e) is carried out using an isocyanate and trimethylamine or triethylenediamine as the basic catalyst.

10. The process of claim 1 wherein step (e) is carried out using a carbamoyl chloride and triethylamine, trimethylamine, or a hydroxide, carbonate or bicarbonate of sodium, potassium, calcium or magnesium as the base.

11. A process for preparing hydroxamoyl chlorides of the formula

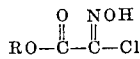

wherein

R is methyl, ethyl or isopropyl by the steps comprising (1) reacting methyl, ethyl, or isopropyl acetoacetate with nitrous acid produced in situ, at a temperature between −10 and 50° C., and a pH above 4.0 in the presence of water, methanol, ethanol, isopropanol or their mixtures;

(2) cooling the product of step (1) to a temperature of from about −10 to 40° C. and chlorinating the cooled product in the presence of water, methanol, ethanol, isopropanol or their mixtures.

12. The process of claim 11 wherein steps (1) and (2) are carried out in water.

13. The process of claim 11 wherein step (1) is carried out at a temperature between 0° C. and 30° C.

14. The process of claim 11 wherein step (1) is carried out at a pH above 4.5.

15. A process for chlorinating esters of acetoacetate oxime of the formula

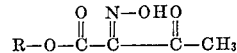

where R is methyl, ethyl or isopropyl comprising reacting the oxime with chlorine at a temperature between −10 and 40° C. in water, methanol, ethanol, isopropanol, or their mixtures, the chlorine being used in an amount approximately equal to stoichiometric.

16. The process of claim 15 wherein the reaction is carried out at a temperature between 10° C. and 30° C.

References Cited

UNITED STATES PATENTS 3,256,330   6/1966   Kilsheimer et al. ___ 260—566A

HENRY R. JILES, Primary Examiner

S. D. WINTERS, Assistant Examiner

U.S. Cl. X.R.

260—561, 566, 293.4, 239, 326.3, 453, 481